United States Patent
Brey

(12) United States Patent
(10) Patent No.: US 7,768,377 B2
(45) Date of Patent: Aug. 3, 2010

(54) SECURITY FOR VEHICLE STARTING

(75) Inventor: Thomas A. Brey, Lake in the Hills, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 177 days.

(21) Appl. No.: 10/969,469

(22) Filed: Oct. 20, 2004

(65) Prior Publication Data
US 2006/0082434 A1   Apr. 20, 2006

(51) Int. Cl.
*H04Q 1/00* (2006.01)
*G06F 7/04* (2006.01)

(52) U.S. Cl. ............ 340/5.6; 340/5.72; 340/5.22; 340/825.49; 307/10.5

(58) Field of Classification Search .......... 340/5.6, 340/5.61, 5.72, 5.33, 5.22, 426.19, 5.31, 340/5.23, 5.24, 825.49, 426.11, 426.12; 307/10.5; 180/287; 123/179.2; 455/404.1
See application file for complete search history.

(56) References Cited

U.S. PATENT DOCUMENTS

| | | | |
|---|---|---|---|
| 5,081,667 A * | 1/1992 | Drori et al. ............. 455/404.1 |
| 5,276,728 A * | 1/1994 | Pagliaroli et al. ........ 455/404.1 |
| 5,334,974 A * | 8/1994 | Simms et al. ............... 340/990 |
| 5,479,157 A * | 12/1995 | Suman et al. .............. 340/5.28 |
| 5,557,254 A * | 9/1996 | Johnson et al. ........ 340/426.19 |
| 5,673,305 A * | 9/1997 | Ross .......................... 455/517 |
| 5,754,652 A * | 5/1998 | Wilfong .................... 713/183 |
| 5,838,251 A * | 11/1998 | Brinkmeyer et al. ....... 340/5.22 |
| 5,880,679 A * | 3/1999 | Lenart et al. ................ 340/5.6 |
| 6,011,460 A * | 1/2000 | Flick .................... 340/426.25 |
| 6,067,007 A * | 5/2000 | Gioia .................... 340/426.19 |
| 6,717,508 B2 * | 4/2004 | Sashida ..................... 340/5.72 |
| 6,847,286 B1 * | 1/2005 | Bartz ........................ 340/5.23 |
| 2003/0055557 A1* | 3/2003 | Dutta et al. ................. 701/208 |

* cited by examiner

Primary Examiner—Edwin C Holloway, III

(57) ABSTRACT

A system and method of providing security for a vehicle starting system. The method including a first step of storing secure information identifying an authorized user of a vehicle. A next step includes detecting an attempt to start a vehicle without an authorized coded starting device. A next step includes placing a telephone call using a vehicle communication device to a service operator requesting service. A next step includes calling the vehicle by the service operator. A next step includes confirming the particular user of the vehicle using the stored information. A next step includes authorizing the starting of the vehicle. Unauthorized coded starting devices can include a non-programmable key, an unprogrammed programmable key, and a code scanning device.

13 Claims, 2 Drawing Sheets

SECURITY FOR VEHICLE STARTING

FIELD OF THE INVENTION

The present invention relates to security systems for vehicles and more specifically, to providing security for vehicle starting.

BACKGROUND OF THE INVENTION

Many of today's electronic car keys are programmed to have a code that matches a code programmed in the automobile. Unless these codes match, the starting system of the vehicle is locked out, and the vehicle cannot be started. The electronic codes, together with the mechanical keying details, create very strong security for cars but the system is not perfect. Some security flaws still exist. Additionally, when a key is lost the consumer may face substantial inconvenience and cost.

A first problem is encountered in the case of lost keys. There are several different standards of secure keys used by the automotive manufactures. The ease and expense to replace lost or stolen keys varies considerably between manufactures. In the most extreme cases, the car must be towed to the dealer where the electronic control module will be re-flashed costing several hundreds of dollars. In most cases, when a key is lost or stolen it needs to be replaced with a programmable key, that can only be provided at a dealer service center and not at a local hardware store or retail center. This can be an issue in remote areas or on weekends when dealer service centers are closed.

A second problem involves key security. Although electronic car keys systems have improved security they are not impregnable. Today anyone can go on the Internet and buy the equipment that will allow a person to program keys or and read a key code from the car. This equipment is intended to be used by a locksmith but nothing prevents the same equipment from being used by car thieves. For example, a code scanning device can be used to read the code from a vehicle, or an electronic "skeleton" key, having multiple codes therein can be used to start the vehicle.

What is needed is a solution that will improve the security of electronically encoded car keys or transponder keys. It would also be of benefit to reduce cost to the consumer and improve convenience when replacing lost or stolen keys.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides a solution that improves the security of electronically encoded car keys or transponder keys. In particular, the present invention uses an existing Telematics system in the vehicle as a security gate to allow programming of new keys while providing an additional level of security. In this way, the present invention reduces cost to the consumer and improves convenience when replacing lost or stolen keys. The present invention would find best application in those cases where an authorized user does not have (e.g. has lost) their keys, but would find more general application to provide anti-theft of the vehicle. Specifically, the present invention allows an authorized user to start and drive their vehicle without having an authorized coded starting device (e.g. coded key, RF identification, etc.). Further, the present invention provides a convenient technique for a user to replace a lost key.

Figure 1:
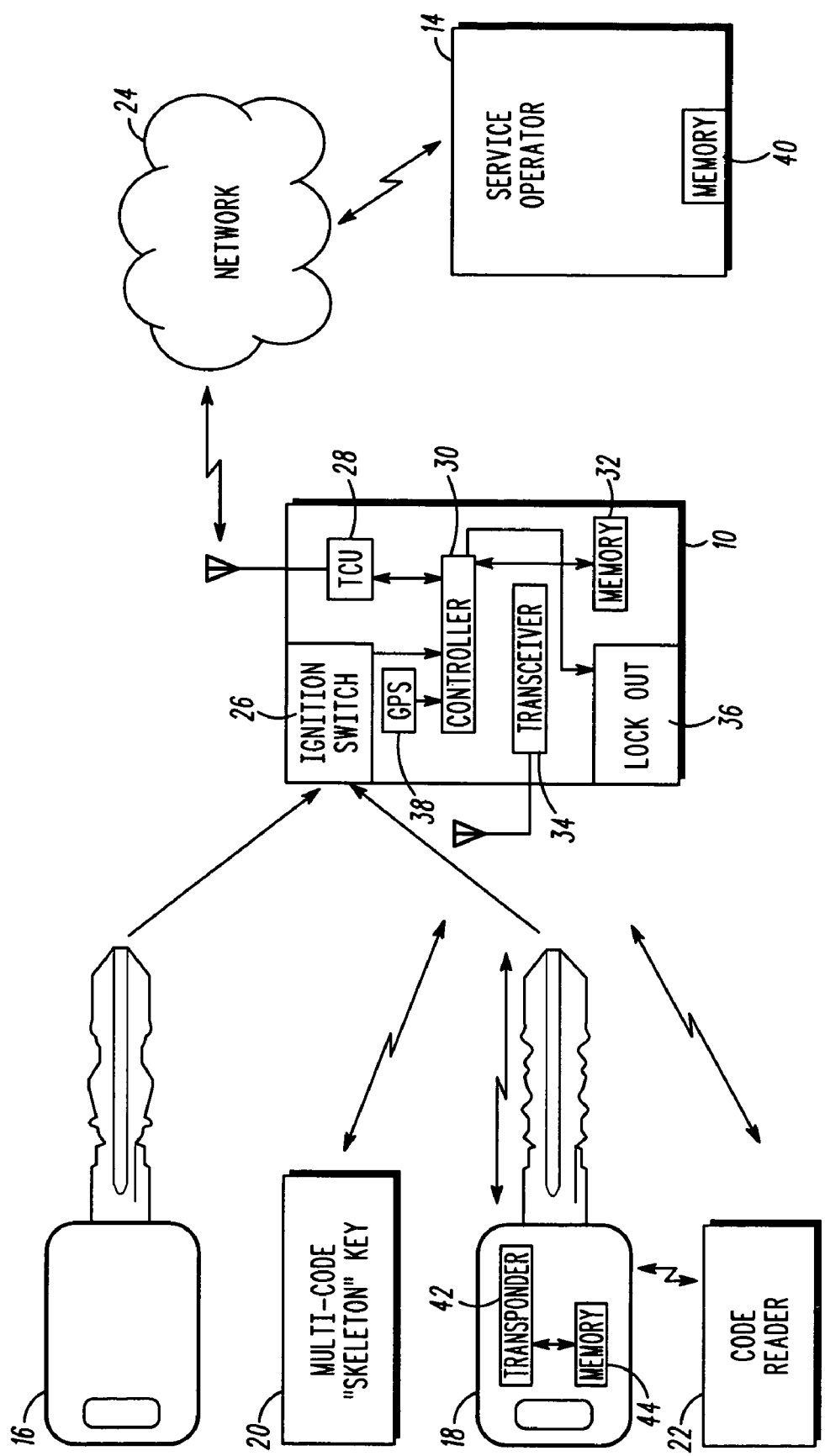
FIG. 1 shows a block diagram of a system overview, in accordance with the present invention.

Referring to FIG. 1, a vehicle starting system is shown that provides improved security for a vehicle. In its most basic form, the present invention includes a radio communication device 28 incorporated in the vehicle 10, a service operator 14 operable to provide service for the radio communication device 28, a controller 30 included in the vehicle starting system and coupled to the radio communication system 28, and an unauthorized coded starting device 12 for operating the starting system.

In particular, the radio communication device 28 can be a Telematics Control Unit (TCU) such as in an OnStar™ system, for example. In this way, the vehicle 10 can communicate to an OnStar™ service operator 14 over a network 24 using Telematics communication protocols. In accordance with the present invention, the service operator 14 includes a memory 40 or other storage device that is used to store secure information identifying an authorized user of a vehicle. In particular, the secure information can be defined by the authorized user when the Telematics service for that vehicle is first set up. For example, the secure information is information, such as a password, mother's maiden name, birth date, information defined by the user that is only known by the user, etc., which would only be generally known by a driver of the vehicle. In addition, secure information can include a user's home location or a known authorized dealer location, wherein a location of the vehicle can be provided by a location determination device, such as a GPS unit 38, to the service operator wherein the service operator can confirm that the vehicle is at the user's home address or dealer before authorizing starting of the vehicle. Separate secure information can be stored for each authorized user of the vehicle, or a single set of secure information can be stored per vehicle.

In the broadest embodiment, when the controller 30 detects an unauthorized attempt to start the vehicle, the controller 30 directs the radio communication device 28 to contact the service operator 14 to send an identification of the vehicle and to report the unauthorized attempt. The identification can include one or more of the telephone number of the network access device of the TCU, the Mobile Identification Number (MIN), the Vehicle Identification Number (VIN), or any other unique identifier. Depending upon the particular type of unauthorized access that is attempted, a particular programming service to authorize starting the vehicle can be requested from the service operator along with available identification of the vehicle and coded starting device, if available. Upon receipt of the attempt notification and the identifier, the service operator 14 calls the vehicle communication device 28 and confirms the particular user of the vehicle using the stored information in memory 40, wherein the service operator 14 authorizes the starting of the vehicle 10 if a user identity is confirmed. The stored information can also be used to store information as to whether the vehicle or coded starting device has been stolen, as could be supplied through public authorities. If the vehicle or coded starting device has been reported stolen, then authorization can be withheld, and the authorities could be contacted and given a location of the vehicle (if GPS equipped). Conversely, programming a coded starting device could be limited to only those vehicles and/or coded starting devices with authorized identification. Several of these aspects of the present invention are expanded upon below.

The present invention considers many different aspects of an unauthorized attempt to start the vehicle. In general, this is defined as any user using an unauthorized coded starting device 12 for operating the starting system of the vehicle. An unauthorized coded starting device 12 can include a programmable key 18 or wireless transponder device (e.g. "credit card" RF identification tag) with a transponder 42 and memory 44 that has not been programmed with the proper code for that vehicle (but possibly having the correct mechanical keying), a non-programmable key 16 (possibly having the correct mechanical keying), a multi-coded or "skeleton" key 20 (possibly used in conjunction with a non-programmable key having the correct mechanical keying), and a code reader 22 or scanner to read the code in the memory 32 of the controller 30 (which is then used to program a programmable key 18 with the correct code). As used herein, "coded" refers to not only an electrically stored number or data specific to a vehicle or key, but also to the mechanical keying of a key to match tumblers in a particular ignition lock/switch. In addition, "non-programmable" also refers to programmable devices that are malfunctioning, wherein the transponder for the device cannot be detected.

A first embodiment of the present invention involves the case where a programmable key is lost and no duplicate programmed key is readily available, but only an unprogammed programmable key is available. In this case, a driver can be easily stranded since many locksmiths, although they can provide programmable keys, do not have the equipment to read a code and program a key, and an authorized dealer may not be nearby or even open. Therefore, in accordance with the present invention, when the controller 30 detects that a user is using a programmable coded starting device 18 that has not yet been programmed to start the vehicle (i.e. the ignition switch 26 can be turned but the transponder 42 has the wrong or missing code), the controller 30 directs the communication device 28 to request new programming for the programmable coded starting device 18 from the service operator. The request can include an identification of the vehicle and an identification (e.g. serial number) of the programmable coded starting device, if available. The service operator 14 then confirms the identity of the particular user of the vehicle using the stored information in memory 40 by asking the user or controller 30 for one or more items of secure information that was pre-stored in the memory 40 when service was initiated identifying that particular user.

In addition, for further confirmation the service operator can confirm that the vehicle is located at a user's home location provided by information transmitted from a location determination device 38. Moreover, the service operator can determine whether the vehicle is located in a high crime area by comparing a location of the vehicle provided by information transmitted from a location determination device 38 to a list of known high theft locations pre-stored in the memory 40, wherein the service operator can apply more or less stringent security requirements or adjust the number of required elements for confirming an identity of an authorized user before authorizing the particular user. The service operator 14 then compares the response(s) to the stored information such that if the response(s) correlates with the stored information the service operator can then send programming information to the controller 30 through the radio communication device 28 for remotely programming the programmable coded starting device 18. Afterwards, the programmed key will act in all respect as the original.

Although a service operator can remote start a vehicle for a service subscriber without a key, such a solution is only temporary since it still leaves a driver without a key. Advantageously, the present invention allows a user to have a new authorized key in a very convenient manner. In particular, if it is inconvenient to go to a dealer for programming, a driver can just obtain a key and have the service operator program the key in the user's very own vehicle.

A second embodiment of the present invention involves the case where a programmable key is lost and no duplicate programmed key is readily available, but an un-programmable key is available that can only be mechanically keyed to the ignition. In this case, a driver can be easily stranded since many retail stores or hardware stores can only provide un-programmable keys, and an authorized dealer may not be nearby or even open. Therefore, in accordance with the present invention, when the controller 30 detects that a user is using a non-programmable coded starting device 16 (which can also include a malfunctioning programmable device) to start the vehicle (i.e. the ignition switch 26 can be turned but no transponder can be detected), the controller 30 directs the communication device 28 to request the service operator to remotely start the vehicle using the non-programmable coded starting device 16. The service operator 14 then confirms the identity of the particular user of the vehicle using the stored information in memory 40 by asking the user or controller 30 for one or more items of secure information that was pre-stored in the memory 40 when service was initiated identifying that particular user.

In addition, for further confirmation the service operator can confirm that the vehicle is located at a user's home location provided by information transmitted from a location determination device 38. Moreover, the service operator can determine whether the vehicle is located in a high crime area by comparing a location of the vehicle provided by information transmitted from the location determination device 38 to a list of known high theft locations pre-stored in the memory 40, wherein the service operator can apply more or less stringent security requirements or adjust the number of required elements for confirming an identity of an authorized user before authorizing the particular user. The service operator 14 then compares the response(s) to the stored information such that if the response(s) correlates with the stored information the service operator 40 can then send information to the controller 30 to temporarily override a vehicle starting lockout system 36 such that the user can start the vehicle using the non-programmable key or malfunctioning programmable key. Further, the service operator 40 can track the vehicle, using GPS signals from the controller 30 so as to limit the movement of the vehicle, such as to the user's designated home location or to a nearby dealership, for example.

A third embodiment of the present invention involves the case where a programmable key is lost and no duplicate programmed key is available, but a programmable key 18 or multi-code key 20 is being used. In this case, an authorized dealer may be attempting to read the code from the controller memory 32 using a code reader 22 to provide a duplicate programmed key 18. It may also be the case that a thief is attempting to start the vehicle using a multi-code key 20. Therefore, in accordance with the present invention, when the controller 30 detects an unauthorized attempt to duplicate the starting code of the vehicle, the controller 30 locks out 36 the vehicle starting system, and directs the communication device 28 to inform the service operator 14 about the lockout.

Optionally, the controller 30 can also lock out any outside code scanning. The service operator 14 then confirms the identity of the particular user by comparison to the stored information (e.g. authorized service center code) in order to authorize the particular user, wherein the service operator 14 can send information to the controller 30 to approve the duplication of the starting code and release the lockout(s) 36 of the vehicle starting system.

In addition, for further confirmation the service operator can confirm that the vehicle is located at a pre-stored dealer's location provided by information transmitted from a location determination device 38. Moreover, the service operator can determine whether the vehicle is located in a high crime area by comparing a location of the vehicle provided by information transmitted from the location determination device 38 to a list of known high theft locations pre-stored in the memory 40, wherein the service operator can apply more or more stringent security requirements or adjust the number of required elements for confirming an identity of an authorized user before authorizing the particular user. The service operator 14 then compares the response(s) to the stored information such that if the response(s) correlates with the stored information the service operator 40 can then send information to the controller 30 to approve the code scanning and release the lockout(s) 36.

In all of the above embodiments, the controller 30 can lockout 36 the vehicle starting system and/or the scanning of codes upon detecting an attempt to start a vehicle without an authorized coded starting device, and only release the lockout 36 upon a signal from the service provider 14.

Figure 2:
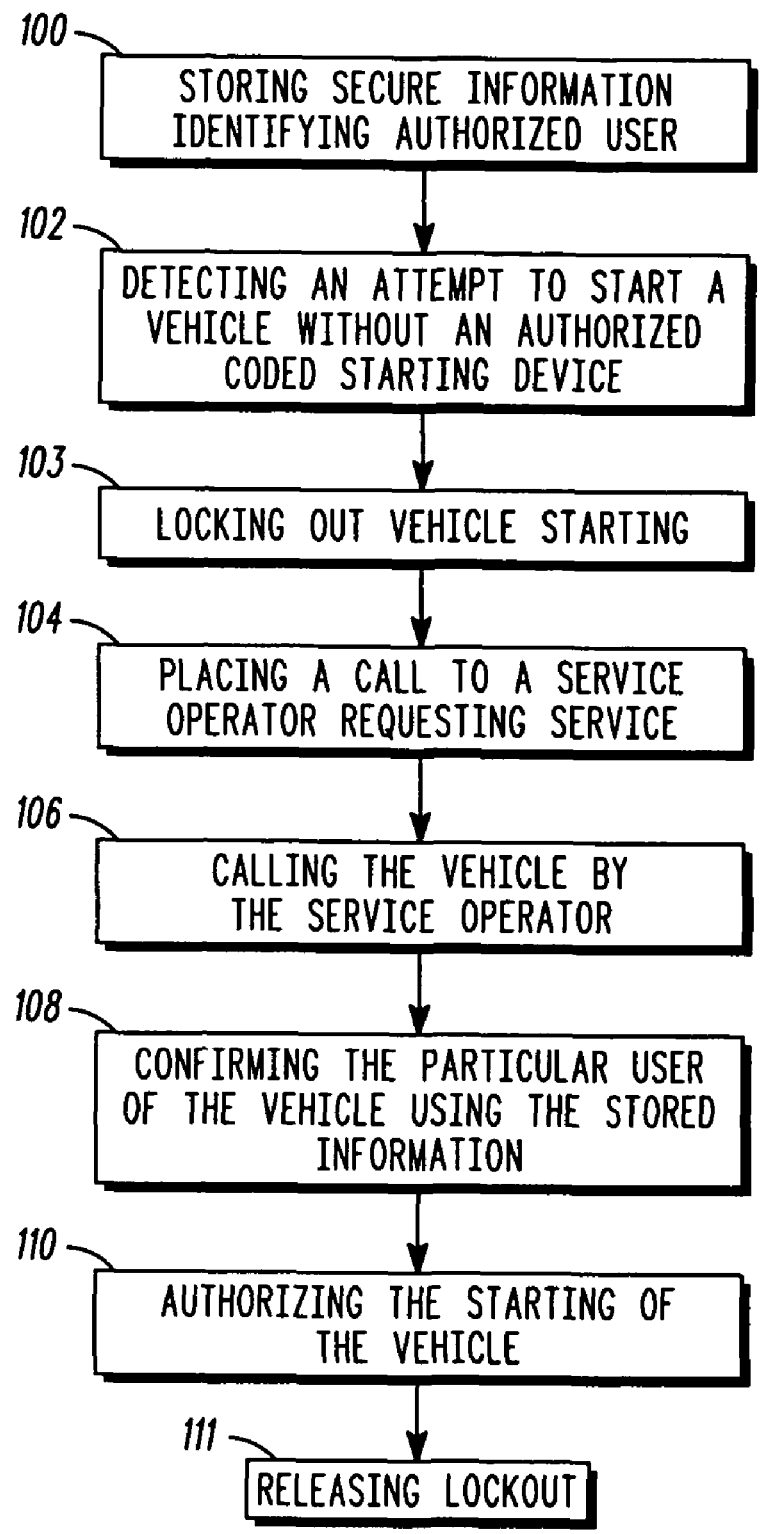
FIG. 2 is a flow chart of a method in accordance with the present invention.

Referring to FIG. 2, the present invention also includes a method of providing security for a vehicle starting system. The method includes a first step of storing 100 secure information identifying an authorized user of a vehicle. In particular, the secure information can be defined by the authorized user when the Telematics service for that vehicle is first set up. For example, the secure information is information, such as a password, mother's maiden name, birth date, information defined by the user that is only known by the user, etc., which would only be generally known by a driver of the vehicle. In addition, secure information can include a user's home location or a known authorized dealer location, wherein a location of the vehicle can be provided by a location determination device, such as a GPS unit, to the service operator wherein the service operator can confirm that the vehicle is at the user's home address or dealer before authorizing starting of the vehicle.

A next step includes detecting 102 an unauthorized attempt to start a vehicle without an authorized coded starting device. An unauthorized attempt, as used herein, is defined as any user using an unauthorized coded starting device for operating the starting system of the vehicle. An unauthorized coded starting device can include a programmable key or wireless transponder device (e.g. "credit card" RF identification tag) that has not been programmed with the proper code for that vehicle (but possibly having the correct mechanical keying), a malfunctioning programmable key or non-programmable key (possibly having the correct mechanical keying), a multi-coded or "skeleton" key (possibly used in conjunction with a non-programmable key having the correct mechanical keying), and a code reader or scanner to read the starting code of the vehicle starting system (which is then used to program a programmable key 18 with the correct code).

A next step includes placing 104 a telephone call to a service operator requesting service. The call can include an identification of the vehicle and a report of the unauthorized attempt. The identification can include one or more of the telephone number of the network access device of the TCU, the Mobile Identification Number (MIN), the Vehicle Identification Number (VIN), or any other unique identifier.

A next step includes calling 106 the vehicle by the service operator upon receipt of the unauthorized attempt notification and the vehicle identifier.

A next step includes confirming 108 the particular user of the vehicle using the stored information. A service operator confirms the identity of the particular user of the vehicle using the stored information by asking the user or controller for one or more items of secure information that was pre-stored when service was initiated identifying that particular user. For further confirmation the service operator can confirm that the vehicle is located at a user's home location or dealer location provided by information transmitted from a location determination device in the vehicle. Moreover, the service operator can determine whether the vehicle is located in a high crime area by comparing a location of the vehicle provided by information transmitted from a location determination device to a list of known, pre-stored high theft locations, wherein the service operator can apply more or less stringent security requirements or adjust the number of required elements for confirming an identity of an authorized user before authorizing the particular user. The service operator then compares the response(s) to the stored information such that if the response(s) correlates with the stored information the service operator can then authorize starting of the vehicle. The stored information can also be used to store information as to whether the vehicle or coded starting device has been stolen, as could be supplied through public authorities. If the vehicle or coded starting device has been reported stolen, then authorization can be withheld, and the authorities could be contacted and given a location of the vehicle (if GPS equipped). Conversely, programming a coded starting device could be limited to only those vehicles and/or coded starting devices with authorized identification.

A next step includes authorizing 110 the starting of the vehicle. This step can include various aspects depending upon the type of unauthorized attempt to start the vehicle. In the first embodiment, where a programmable key is lost and no duplicate programmed key is readily available, but only an un-programmed programmable key is available, the authorizing step 110 includes sending programming information to the vehicle for remotely programming the programmable coded starting device. Moreover, the transfer of information can be encrypted by the service operator to be decrypted by the vehicle communication device before programming the key. Specifically, in the first embodiment, when the detecting step 102 includes detecting that a user is using a programmable coded starting device, such as a programmable key or RF identification device, that has not yet been programmed to start the vehicle, and wherein the placing step 104 includes requesting new programming for the programmable coded starting device, and wherein the confirming step 108 includes asking the user for secure information identifying the particular user and comparing this to the stored information, and wherein the authorizing step 110 includes sending programming information to the vehicle for programming the programmable coded starting device.

In a second embodiment, where a programmable key is lost or malfunctioning and no duplicate programmed key is readily available, but the malfunctioning programmable key or an un-programmable key is available that can only be mechanically keyed to the ignition, the authorizing step 110 includes sending information to the controller to temporarily override a vehicle starting lockout system such that the user can start the vehicle using the non-programmable key or malfunctioning programmable key. This second embodiment can include the further steps of tracking the vehicle, using the location determining device of the vehicle, and limiting the movement of the vehicle, such as to the user's designated home location or to a nearby dealership, for example. Specifically, when the detecting step 102 includes detecting that a user is using a non-programmable coded starting device, such as a malfunctioning programmable key or a non-programmable key that is mechanically keyed to turn the ignition switch of the vehicle, to start the vehicle, and wherein the placing step 104 includes a request to start the vehicle using the non-programmable coded starting device, and wherein the confirming step 108 includes asking the user for secure information identifying the particular user and comparing this to the stored information, and wherein the authorizing step 110 includes the service operator starting vehicle for the user. Alternatively, the authorizing step 110 includes the service operator sending information to temporarily override a vehicle starting lockout system.

In a third embodiment, where a programmable key is lost and no duplicate programmed key is available, but a programmable key, multi-code key, or code reader is being used, the authorizing step 110 includes sending information to the vehicle to allow code scanning. Specifically, when the detecting step 102 includes detecting one or more unauthorized attempt to duplicate the starting code of the vehicle, and wherein the placing step 104 includes information about the unauthorized attempt to the service operator, and wherein the confirming step 108 includes identifying the user and comparing this to the stored information, and wherein the authorizing step 110 includes the service operator approving the duplication of the starting code and a releasing of the lockout of the vehicle starting system.

In all of the above embodiments, the method can include the further steps of locking out 103 the vehicle starting system and/or the scanning of codes upon detecting 102 an attempt to start a vehicle without an authorized coded starting device, and releasing 111 the lockout(s) upon a signal from the service provider.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. Apparatus comprising:
   a vehicle telematics unit configured to wirelessly communicate with a service operator; and
   a vehicle starting system controller configured to:
   detect an attempt by a vehicle user to use a non-programmable coded starting device to start the vehicle,
   in response to detecting the attempt to use the non-programmable coded starting device to start the vehicle, direct the telematics control unit to request that the service operator confirm an identity of the vehicle user that is trying to start the vehicle, and
   in response to the service operator confirming the identity of the vehicle user that is trying to start the vehicle, temporarily override a vehicle-starting-lockout system, thereby allowing the vehicle user to use the non-programmable coded starting device to start the vehicle.

2. The apparatus of claim 1, wherein the non-programmable coded starting device is a malfunctioning programmable coded starting device.

3. The apparatus of claim 1, wherein the non-programmable coded starting device has mechanical keying that allows the vehicle user to turn an ignition switch of the vehicle.

4. The apparatus of claim 1, wherein the service operator confirms the identity of the vehicle user that is trying to start the vehicle by asking the vehicle user to provide one or more items of pre-stored secure information.

5. The apparatus of claim 1, further comprising a Global Positioning System unit configured to provide location information to the service operator thereby enabling the service operator to limit movement of the vehicle.

6. Apparatus comprising:
   a vehicle telematics unit configured to wirelessly communicate with a service operator; and
   a vehicle starting system controller configured to:
   detect an attempt by a vehicle user to use an unprogrammed programmable coded starting device to start the vehicle,
   in response to detecting the attempt to use the unprogrammed programmable coded starting device to start the vehicle, direct the telematics control unit to request that the service operator confirm an identity of the vehicle user that is trying to start the vehicle, and
   in response to the service operator confirming the identity of the vehicle user that is trying to start the vehicle, receive programming information from the service operator and use the received programming information to program the unprogrammed programmable coded starting device.

7. The apparatus of claim 6, wherein the unprogrammed programmable coded starting device has mechanical keying that allows the vehicle user to turn an ignition switch of the vehicle.

8. The apparatus of claim 6, wherein the service operator confirms the identity of the vehicle user that is trying to start the vehicle by asking the vehicle user to provide one or more items of pre-stored secure information.

9. Apparatus comprising:
   a vehicle telematics unit configured to wirelessly communicate with a service operator; and
   a vehicle starting system controller configured to:
   detect an attempt by a vehicle user to use either a multi-code key or a code reader to duplicate a vehicle starting code,
   in response to detecting the attempt to duplicate the vehicle starting code, lockout a vehicle starting system and direct the telematics control unit to notify the service operator of the lockout and to request that the service operator confirm an identity of the vehicle user that is trying to duplicate the vehicle starting code, and
   in response to the service operator confirming the identity of the vehicle user that is trying to duplicate the vehicle starting code, allow duplication of the starting code and release the lockout of the vehicle starting system.

10. The apparatus of claim 9, wherein the vehicle starting system controller is further configured to: in response to detecting the attempt to duplicate the vehicle starting code, lockout any outside code scanning.

11. The apparatus of claim 9, wherein the service operator confirms the identity of the vehicle user that is trying to duplicate the vehicle starting code by asking the vehicle user to provide one or more items of pre-stored secure information.

12. The apparatus of claim 11, wherein the one or more items of pre-stored secure information includes an authorized service center code.

13. The apparatus of claim 12, further comprising a Global Positioning System unit configured to provide location information to the service operator thereby enabling the service operator to confirm that the vehicle is located at a location corresponding to the authorized service center code.

\* \* \* \* \*